United States Patent [19]
Carr

[11] 3,909,298
[45] Sept. 30, 1975

[54] BATTERIES COMPRISING VENTED ELECTRODES AND METHOD OF USING SAME

[75] Inventor: Peter Carr, Utica, Mich.

[73] Assignee: Energy Development Associates, Madison Heights, Mich.

[22] Filed: July 16, 1973

[21] Appl. No.: 379,502

Related U.S. Application Data

[63] Continuation of Ser. No. 200,043, Nov. 18, 1971, abandoned.

[52] U.S. Cl. .............................................. 136/86 A
[51] Int. Cl. ........................................... H01m 29/02
[58] Field of Search ....... 136/86 A, 86 D, 136, 137, 136/121, 177, 154, 153

[56] References Cited
UNITED STATES PATENTS

| | | | |
|---|---|---|---|
| 3,019,279 | 1/1962 | Blue et al. | 136/103 |
| 3,134,698 | 5/1964 | Neipert et al. | 136/121 |
| 3,188,242 | 6/1965 | Kordesch et al. | 136/136 |

Primary Examiner—John H. Mack
Assistant Examiner—H. A. Feeley
Attorney, Agent, or Firm—B. F. Claeboe; Richard P. Mueller; Arthur E. Kluegel

[57] ABSTRACT

An electrode for use in an electrical energy storage device comprising a first side and a second side, thereby forming a channel for flow of an electrolyte with gas dissolved therein, whereby said first side has holes for venting of undissolved gas.

13 Claims, 4 Drawing Figures

U.S. Patent  Sept. 30, 1975  3,909,298
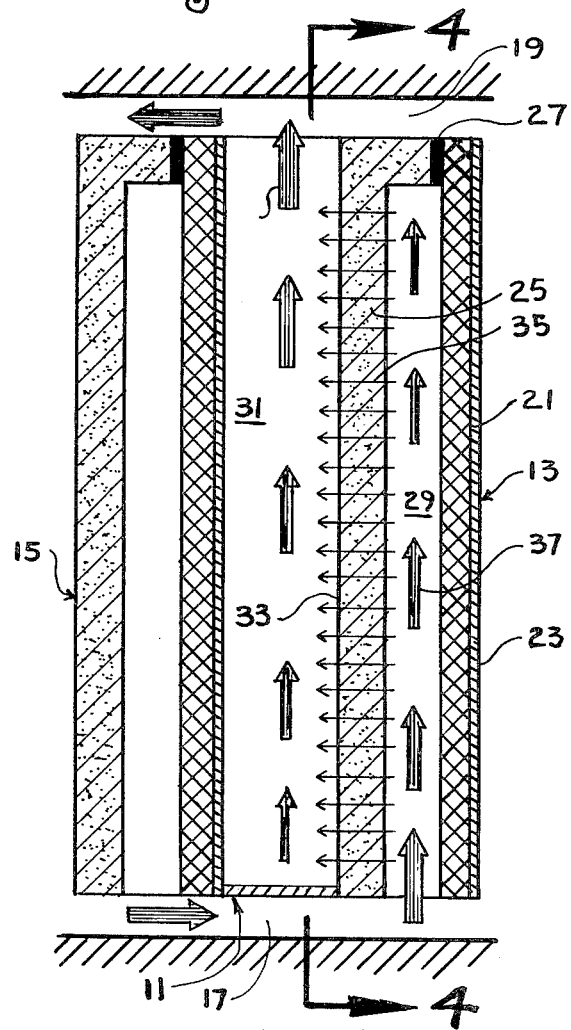
Fig. 1.
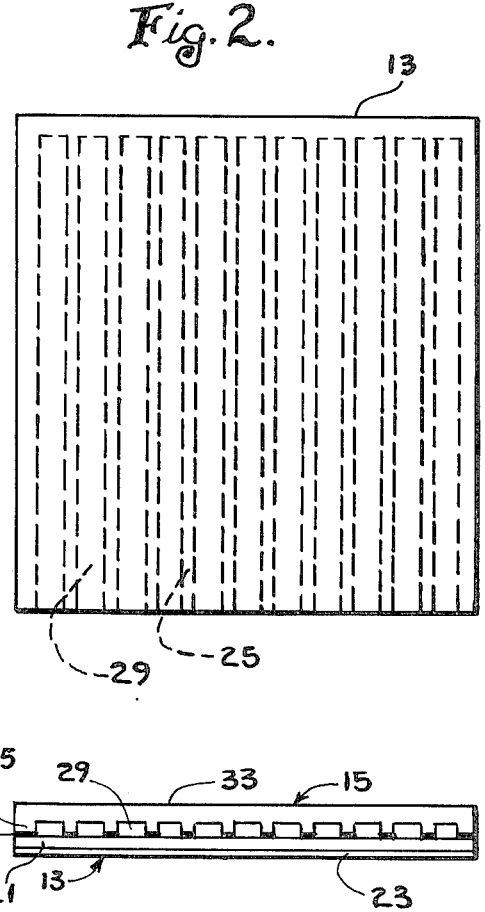
Fig. 2.
Fig. 3.
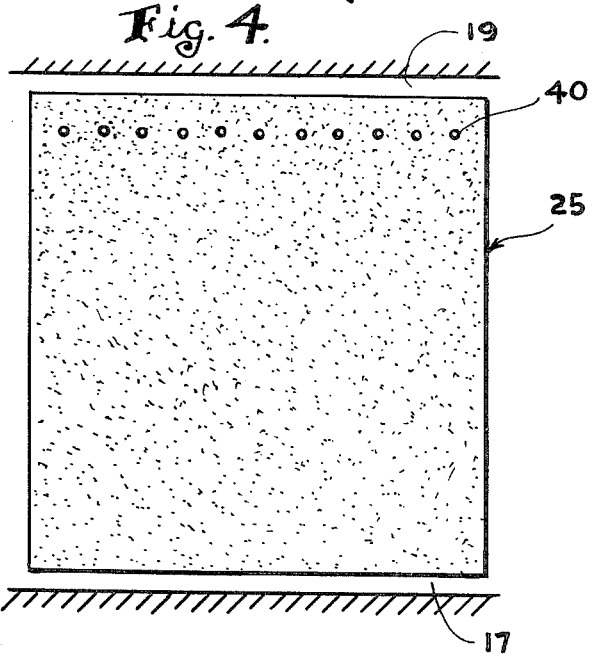
Fig. 4.

BATTERIES COMPRISING VENTED ELECTRODES AND METHOD OF USING SAME

This is a continuation of application Ser. No. 200,043, filed Nov. 18, 1971, now abandoned, hereby incorporated by reference.

BACKGROUND OF THE INVENTION

High energy density batteries have been produced which are rechargeable, light in weight (producing at least 50 watt-hours per pound or more) and made from readily available materials. Recently, various attempts have been made to improve the power: weight ratio, battery performance characteristics and dependability so as to make such batteries suitable for use to power electric drive automobiles. Such a system is described in U.S. Ser. No. 50,054, filed June 26, 1970 now U.S. Pat. No. 3,713,888 hereby incorporated by reference. Bipolar electrodes have been suggested as a convenient means of operating rechargeable high energy density batteries. Difficulties have arisen in those systems wherein a gas made available for discharge will form a gas lock in the flow channels of the electrolyte. In addition, other foreign gases, such as hydrogen which may be liberated during discharge, may form a gas lock. Such disadvantages have been overcome to a significant extent by the present invention.

SUMMARY OF THE INVENTION

This invention relates to high energy density batteries and cell components thereof which include as an important novel feature in particular bipolar electrodes such as those having an impervious wall, preferably of graphite, having on the outside thereof a highly electrodepositive metal, and a porous anode or positive anode, preferably of carbon (including porous graphite), held to the inside of the wall and with it defining a plurality of passageways through which electrolyte passes through the porous member and enters the reactive portion of the cell. The other electrode of the cell is a highly electropositive metal, such as zinc, on the impervious wall of an adjoining bipolar electrode. During charging of the cell, zinc is deposited on to the impervious wall, as by plating from a zinc chloride electrolyte on to the negative electrode (cathode), during which depositing chlorine is generated at the positive electrode (anode); during discharge a solution of zinc chloride containing dissolved and gaseous chlorine is passed through the cell and electricity is generated as the zinc dissolves to form zinc ion and the chlorine is converted to chloride ion. The electrolyte is then reenriched with chlorine and is returned to the cell for further generation of electricity.

In order to eliminate or alleviate gas locks that may occur in the electrolyte channels, holes are drilled in the upper portion of the electrolyte channels to permit the venting of trapped gas.

DESCRIPTION OF PREFERRED EMBODIMENTS

The present invention and its mode of operation will be readily apparent from the following description, taken in conjunction with the accompanying drawing, in which:

FIG. 1 is a central vertical section of a pair of bipolar electrodes of this invention, which form a cell, with the flow of electrolyte into the electrode, throught it and into the reactive space of the cell being illustrated;

FIG. 2 is a side elevation of the electrode, seen from the metal coated side thereof; and FIG. 3 is a bottom plan of the electrode of FIG. 2, showing the flatness of the electrode and illustrating the passageways therein.

FIG. 4 is a frontal view of FIG. 1 along lines 4—4 showing the face of the porous electrode with the holes drawn in the upper portion thereof.

The electrolytic cell of FIG. 1 has two bipolar electrodes 13 and 15 with an area 11 between the electrodes for electrolyte flow. The electrodes are held together in a frame, not illustrated, and are communicating with electrolyte inlet duct 17 and outlet manifold 19. The electrodes each have a gas impervious and electrolyte-impervious wall 21 of graphite, which extends vertically and on its outer surface, after charging or fuelling of the secondary battery of which the cell is a part, has a coating or plated layer 23 of highly electropositive metal, e.g., zinc. The inner surface of the impervious wall is cemented to porous electrode base member 25, by an electrically conductive resinous polymeric cement layer 27. Some suitable cements are described in an application of Carr et al. for Conduction Cement for Halogen Hydrate Battery System, filed on the same day as the present application, and identified by Case No. U 10,081 U.S. Ser. No. 200,062 hereby incorporated by reference. The porous member has a plurality of vertical passageways 29, also well illustrated in FIGS. 2 and 3, through which electrolyte may pass, usually from the lower to the upper portion of the electrode, as shown. Because the porous carbon member has pores or passages in it extending from the inner portion near the vertical passageways to the outer portion, fronting on the reactive zone of the cell, electrolyte pumped into duct 17 by pumping means, not illustrated, penetrates the porous body of member 25 and enters reaction zone 31. Due to the pumping pressure, the flow of the electrolyte is vertically upward and out manifold duct 19 wherein it mixes with other electrolytes from other cells and, after enrichment with chlorine, is recirculated through the electrodes.

It is to be appreciated that the impervious wall is relatively impervious when compared to the porous electrode. The electrolyte may weep through the impervious wall with the passage of time but the rate of flow through the impervious wall is substantially less than through the porous side.

An important feature of the present invention is that the inner surface 33 of porous carbon member 25 is maintained in continuing contact with dissolved chlorine that is in the electrolyte passed through the porous member to the reaction zone. No boundary layer of stagnant electrolyte insulates the electrode surface from chlorine, as could be the case if it were to enter the cell only at the bottom of the reaction zone.

By causing an excess of electrolyte to enter the passageways 29, one maintains them full at all times, prevents the porous carbon member from having a stagnant electrolyte and the deficiency of halogen at an upper surface portion, maintains the desired direction of electrolyte flow, and prevents undesirable backflows. The proportion of electrolyte may be regulated by suitable means, such as by adjustments of valves, not illustrated, or pumping pressures or capacities.

A number of cells of the type illustrated may be joined together in series to form cell banks and these may be further joined in series to increase the voltages developed, in parallel to increase current capacity or in mixed series-parallel, to do both. The batteries made according to the illustration and descriptions given are of an improved power-weight ratio, usually over 50, and preferably over 100 watt-hours per pound and having a theoretical upper limit of about 185 watt-hours/lb., utilizing a zinc chloride solution in which the molar ratio of $ZnCl_2$ to $H_2O$ is about 1:8. Such batteries are strong and are suitable for use in automobiles and trucks, where they withstand the ordinary shocks attending uses of such vehicles. They are also long lasting, comparatively easy to manufacture, utilize readily available materials, recharge well or are easily refuelled, and are efficient and economical to operate. Among the most important advantage of the present batteries, cells and electrodes made from the particular materials of construction and electrolyte, is the passage of the electrolyte so readily and evenly through one of the walls of the bipolar electrode. As indicated by arrows 35 passage of the electrolyte through the porous carbon is substantially even from the bottom to the top while arrows 37, which diminish in size as they move upwardly, indicate the decreasing of the volume of electrolyte flowing in passageways 29. Arrows 39 show the correspondingly increasing volume of electrolyte through reaction zone 31. It will be evident that without the particular mechanism for contacting surface 33 with chlorine-enriched electrolyte, the efficiency of electricity generation at the upper portion of the electrode would be diminished, due to loss of chlorine in the electrolyte as it moves upwardly. Such uneven generation of electric potential at different locations on the electrodes would tend to lead to inefficient operations, due in part to internal short-circuiting.

The framework in which the elements of the present cells are held is of a suitable electrically non-conductive plastic, preferably polyvinyl chloride, PVDC, phenol formaldehyde, chlorinated polyester or acrylonitrilo-butadiene-styrene resin, but may be of hard rubber or other suitable insulative material which is resistant to wet chlorine and aqueous metal (zinc) salt on aqueous metal halide solution. Preferably, the frame is made so that it can be accommodate a plurality, e.g., 10 to 30, of bipolar electrodes and provide inlet and outlet ducts or manifolds for them. In some embodiments, the frame is comprised of sections which, together with the electrodes, are held in unit batteries by pressure against them. Some of these embodiments of the invention resemble a plate and frame press. Of course, it will be know how to design and manufacture suitable frames to produce batteries from the present cells and to provide electrolyte circulation.

The impervious wall, which usually extends vertically, may be made of any suitable material onto which a metal electrode may be fastened, deposited or plated. Although synthetic organic resins and rubbers may be employed, it is preferred to utilize a carbon which is sufficiently impervious so as to allow the deposit of a smooth metallic coating on the outer side thereof, which will not be loosened by cell or electrolyte pressure because such pressure will not be transmitted through the wall. In some instances porous carbon may be employed, treated with resins on its outer surface to make it impervious to gas and liquid passage. It is, however, much prefered that graphite be utilized since it is an excellent non-metallic conductor, non-reactive with the electrolyte and capable of being readily plated by or otherwise joined to the metal of the electrode surface. Although various thicknesses of the impervious wall portion of the electrode may be used, generally the graphite wall will be from 0.1 to 1.5 millimeters thick, preferably from 0.1 to 1 mm. The electrode itself may be of any of a wide variety of sizes but it will be preferred to utilize one which has a major surface area (corresponding to a single outer plateable surface) of from 50 to 1,000 square centimeters, preferably from 100 to 400 sq. cm., which usually discharge up to 1 ampere per square cm.

The porous member of the electrode is of approximately the same shape and size as the impervious wall, because it is designed to match that wall and to form with it internal passageways for the electrolyte to enter the cell reaction zone. Normally, the porous member will be made from graphite or an activated carbon of animal or vegetable origin such as are well known and have extremely high surface areas, but it can also be produced from the carbon obtained by burning or pyrolyzing oil or gas. Additionally, other known electrode materials which are electrically conductive and sufficiently resistant or inert to the environment may be employed, e.g., sintered titanium or rutile with a noble metal or oxide catalyst, e.g., platinum or ruthenium oxide. The use of highly divided high surface area particles improves contact of the dissolved chlorine with the inner surface of the porous electrode base, which is a wall of the cell. The porosity of the base, hereafter referred to as carbon, a preferred material, will be such that 20 to 80% of a cross-section thereof is carbon, with the rest being voids, suitable for the passage of the electrolyte. Preferably, the porosity will be from 30 to 60%. The porous carbon may be made from granules or powders of activated or other carbons of various sizes and by choices of the powder sizes and resin proportions the sizes of the passageways and the percent carbon in the product can be regulated. Normally, resins are employed to bond the carbon and the resins may be burned off or chemically removed after such bonding is effected, their removal providing paths for the passage of electrolyte. See the Encyclopedia of Chemical Technology (2nd Edition), by Kirk and Othmer, Vol. 4, Pg. 58, for a description of suitable electrode materials.

Usually the pores or passages through the porous carbon will have an average diameter of from 5 to 300 microns, preferably from 10 to 100 microns, and most preferably, of 25 to 50 microns. The least transverse thickness of the porous carbon (transverse to the major surface of the elctrode walls) will be from 0.3 to 3 millimeters, generally from 0.5 to 2 mm. The porous carbon wall, at its thickest, will be from 1 to 5 times as thick as the graphite wall.

Although either the impervious wall, hereafter referred to as graphite, the most preferred material, or the porous carbon member may be hollowed out or grooved to contain a plurality of vertical passageways for the electrolyte, it is normally preferred to mold, extrude or otherwise form the passageways in the surface of the porous carbon before sealing to the graphite. The number of passages will generally be from 5 to 25 and their measurements will be from 0.5 to 2 mm. deep and 0.5 to 5 mm. in width. The ratio of width to depth of the passageways will generally be in the range of 2:1 to 10:1. The porous carbon will be held to the graphite wall by any suitable adhesive material, preferably a polymeric resin which may be of either the thermosetting or thermoplastic types. Suitable resins include those which are inert to the environment, e.g., epoxies. The thickness of the resin will normally be very low, usually from 0.01 to 0.5 mm., for best results, and it usually covers the entire contact area.

It is to be appreciated that the grooves may just as well be in the impervious electrode. However, it is more desirable to have the grooves in the porous electrode because it is wider than the impervious electrode and, therefore, more structurally sturdy.

The highly electropositive metal, which may be plated out on the graphite outer surface during the charging of the battery by passing a direct current through a metal halide electrolyte in contact with the battery electrodes, may be any suitable metal of a sufficiently high electromotive force to generate a satisfactory battery voltage in conjunction with the halogen employed. Although iron, cobalt and nickel all have sufficiently high e.m.f.'s, the most preferred metal, with the highest practical e.m.f. and lowest comparative weight, and most suitable for use in these processes, is zinc. Other suitable metals are listed in U.S. patent Application Ser. No. 50,054, for Halogen Hydrate, as well as those described in ID U 10,053 U.S. Ser. No. 200,070, now abandoned, hereby incorporated by reference covering a Refuelable Electric Energy Storage Device. Both cases are incoporated by reference.

The thickness of the zinc on the graphite electrode is normally from 25 to 4,000 microns thick, preferably from 100 to 1,500 microns but in suitable circumstances, other thicknesses of zinc may be useful. Similar thicknesses of other metals will be used, when they are employed.

The electrolyte is a metal salt corresponding to the metal employed as one electrode surface and the halogen utilized. Although bromine may be the halogen in some embodiments of the invention, it is highly preferable to utilize chlorine. Therefore, the electrolyte salt will usually be zinc chloride. In the electrolyte the concentration of zinc chloride in the aqueous medium may range from about 0.1% by weight to saturation; preferably 5% to 50%; and even more preferably 10% to 35%.

The use of the zinc-chlorine-zinc chloride system is superior to the use of a system depending on bromine because chlorine is lighter than bromine, contributing to the high energy density of the battery, and additionally, is more readily removed from the electrolyte medium when the battery is being charged. The lower solubility of chlorine in electrolyte decreases its diffusion to the zinc electrode (compared to bromine) and so results in less self-discharge reactions with the zinc on standing. Chlorine, being a gas, passes off and may be easily recovered, preferably as chlorine hydrate, from which it may be released when desired for discharging the battery and supplying electricity to external motors, etc.

The concentration of zinc chloride in the electrolyte will usually be 10 to 35%, during both charge and discharge.

The temperature of the electrolyte may vary over a wide range but usually will be from 0°C to 80°C., preferably from 15°C. to 40°C. Pressures will be 0.5 to 10 atmospheres, preferably 0.8 to 2 atmospheres, and most preferably 1 atmosphere ±10%.

Although other materials are not required in the electrolyte to make the battery operative, it is preferred to add materials which control the deposition of zinc on and its removal from the cathode to avoid formation of dendrites. Such additives are described in U.S. Patent Application entitled, Battery Electrolyte Composition, ID U 10,079, U.S. Ser. No. 200,221 hereby incorporated by reference filed on even date herewith.

In operation, a solution of zinc chloride containing from 0.1 or 0.2 to 3 volumes of chlorine, at a temperature of 15°C. to 40°C., preferably about 30°C., is directed into the passageways of the electrodes between the impervious carbon and porous carbon sheets and through the pores of the porous carbon into the reaction zone of the cell at a rate such that the linear velocity upward through the cell averages from 2 to 50 cm./second. The pressure differential to have such a flow is in the range of about 0.01 to 1 kg./sq. cm. The cell voltage generated is about 2.1, open circuit, and the finished battery has a capability of supplying about 5,000 watt-hours with about 125 cells.

After passing through the reaction zone or being by-passed, the electrolyte streams are mixed together and additional chlorine is dissolved in the electrolyte to bring it up to the desired content, e.g., about 2–3 volume percent. Preferably, the chlorine is supplied by chlorine hydrate and in some cases, some chlorine hydrate may pass into the cell with the electrolyte and release its chlorine there. The use of chlorine hydrate is especially desirable because the water added with the chlorine reduces the concentration of the zinc chloride, which has been increased by the dissolving of some of the zinc and the ionization of the chlorine in a previous pass of the electrolyte through the reaction zone, thus resulting in reasonably constant zinc chloride concentrations. The hydrate may be made by methods described in an application for a U.S. patent, entitled Manufacture of Chlorine Hydrate, filed the same day as the present application and identified as Case No. 2802, U.S. Ser. No. 200,047 hereby incorporated by reference or in Ser. No. 50,054.

During discharge the vented electrodes of the present invention will permit the undissolved gas, preferably, chlorine gas to come through apertures or holes 40 in the porous electrode and enter into manifold 19 for recirculation. This thereby permits continuing flow of chlorine gas which is undissolved in the electrolyte out the system for recirculation. Generally, the holes in the electrode range in size from about 0.1 to 3 mm, preferably 0.5 to 1.5 mm and even more preferably 0.7 to about 1.3 mm. The electrolyte with gas dissolved therein normally wets the porous electrode so that the gas bubbles which are not dissolved in the electrolyte cannot pass through the porous electrode. The apertures or holes in the upper portion of the electrode, therefore, permit the gas to escape into the manifold 19 for subsequent recirculation.

After discharge of the battery the cells thereof are recharged by connecting a source of direct current at the appropriate voltage to the electrodes, with the positive pole of the source being connected to the porous carbon electrode base member and negative pole connected to the impervious graphite wall near the outer surface thereof. Current is caused to flow until a suitable thickness of zinc forms on the graphite wall, indicating sufficient charging. Chlorine developed at the porous electrode base member during charging is removed, separated from the electrolyte and conveniently converted to chlorine hydrate, where it remains a source of chlorine for use when the battery is to be discharged. Zinc ions from the zinc chloride electrolyte are converted to zinc metal and plate out on the impervious graphite electrode adjacent to the reaction zone. After circulating through the reaction zone the depleted zinc chloride electrolyte passes into contact with a more saturated solution of zinc chloride or solid zinc chloride and the additional amount of the salt is added to the electrolyte to maintain its desired content therein.

The batteries made supply electric current continuously in operation and are almost entirely trouble-free. If desired, a diaphragm may be interposed between the porous carbon and the zinc, to prevent contact of chlorine with the zinc. Although this will increase the efficiency of the cell, the cells are operative without diaphragms, which are often omitted because in the thin cells most utilized in the practice of this invention any tendencies of inexpensive diaphragm materials to sag, expand, stretch, or become weakened could lead to blocking of electrolyte flow through the cell and could cause ineffectiveness thereof.

The following examples illustrate the operation of the invention. All parts are by weight and all temperatures are in °C. unless otherwise mentioned.

EXAMPLE 1

A bipolar electrode for a high energy density secondary battery cell is made by cementing an impervious graphite layer onto a pre-formed porous carbon (porous graphite may also be used) base and depositing on to the impervious graphite a highly electropositive metal. The electrodes made are square, have surface areas of about 170 square centimeters, are approximately 3 millimeters thick and are cemented together with a conducting epoxy resin-ester cement which is resistant to the electrolyte employed and to chlorine. The porous carbon is about 2.5 mm. thick, including the passageways therein and the graphite is about 1/5 the carbon thickness. The passageways are cut about half way through the thickness of the porous carbon and extend, as illustrated in FIG. 2 of the drawing, almost to the end of the electrode. They are rectangular, with widths about twice their thicknesses. The graphite is a non-porous graphite identified as ATJ by the manufacturer, Union Carbide Corporation. It is of limited porosity (essentially non-porous) and of fairly high density, having been resin-filled and baked and refilled and rebaked for a sufficient number of times to densify the graphite and make it impervious. The porous amorphous carbons employed are identified as Grade 45 or Grade 60, also by Union Carbide. The porosity of the carbon is such that 45 to 50% thereof is voids and the pore sizes are in the 25 to 50 micron range.

The porous graphite electrode of FIG. 4 has a small hole (3/64 inch) drilled into each flow channel at the top of the channel. These holes allowed any gas getting into the stack to be vented, thus preventing gas locking within the flow channels.

The electrolyte used is an aqueous zinc chloride which, during discharge of the cell, contains about 3 grams per liter of dissolved chlorine. In discharge, the cell develops 2.1 volts open circuit and 1.65 to 1.7 volts at 8 amperes. A combination of 24 cells, electrically connected in series and with common manifolds for electrolyte flows in and out, develops 50 volts open circuit and 40 volts under an 8 ampere load. During charging of the battery the flow rate is about 600 milliliters of electrolyte per cell per minute and during discharge it is about 400 mls per cell per minute.

To start up the cell, which is of the design illustrated in the figures of the drawing, electrolyte (35% zinc chloride) is pumped through the porous carbon anode to the reaction zone of the cell at the mentioned charging rate. Normally, the example given herein, the pressure will be held at atmospheric plus the head required for flow, usually from 1 to 2 lbs/in.$^2$.

With about 60 volts applied to the battery or about 2.5 volts applied to an individual cell, the cells are charged by circulation of electrolyte through them, which liberates chlorine at the surface of each porous electrode and deposits zinc on the graphite surface of each cathode. Generally, charging takes about 2 hours, after which time the zinc should be deposited in an even layer about 200 microns thick. Instead of charging in situ, such a zinc coating may otherwise be fastened to a graphite base or plating may occur external to the operating cell. Then, the cell is ready for use (discharge).

In use, aqueous zinc chloride electrolyte containing about three grams per liter of dissolved chlorine, is forced through the cell at the rate of 400 mls per minute. There is generated an open circuit voltage of about 2.1 volts per cell, which is about 1.7 volts per cell at eight amperes. As is illustrated by the sizes of the arrows in FIG. 1, the flow through the porous carbon is regular.

After the electrolyte has flowed through the cell on discharge and the dissolved chlorine is consumed, it is renewed by being saturated with chlorine and returned to the cell, where discharging operation continues. On discharge, the zinc of the cathode is dissolved and becomes zinc ions, while the chlorine in the electrolyte is forced through the porous anode and becomes chloride. Discharging will continue until all the metal has reacted with the halogen. The cell is recharged. The opposite reaction occurs, of course, during charging.

In the most useful applications of the present cells, several batteries made from them are utilized together to power an electric truck for over 100 miles at about 30 miles per hour. Subsequently, either the batteries are replaced or recharged in a charging station, or electrodes thereof, held together by a framework are replaced in each battery. Then, the removed electrodes are refuelled with zinc and subsequently, are installed in another battery. Times for such refuelling operations are minimal, often being as little as 5 minutes, including checking the density of the electrolyte and partially replacing it, checking the concentration of chlorine and adding more chlorine hydrate to the system, and replacing electrodes. In a comparison with a similar battery in which the electrodes employed are not porous and in which electrolyte is added directly to the reaction zones at the bottom thereof, greater efficiencies of charging and discharging are obtained if the apparatuses and methods of this invention are used. This is probably because of the improved contact area of gaseous chlorine with the anode surface, due to its being brought into more intimate contact with such surface by penetration of the amorphous carbon pores and passageways.

EXAMPLE 2

The procedures of Example 1 are repeated but the conditions are changed so that the electrolyte is nickel chloride and the electropostive metal is nickel. The batteries are heavier and the efficiency of electricity generation is lower but such batteries are feasible, if one is willing to sacrifice such advantages.

When the dimensions of the cells are changed so that the reaction zones are twice as thick, the battery size must be increased and, therefore, such cells are not as satisfactory as that previously mentioned in Example 1. Variations in the nature of the porous amorphous carbon over the porosity range from 30 to 60% do not seriously affect efficiency nor does operation at temperatures in the 20° to 40°C. range, rather than 30°C., as in Example 1. When the amorphous carbon being used has larger pores the efficiencies of charge and discharge are diminished so that when the pores are over 300 microns in diameter there is a noticeable falling off of efficiency. This is also true when the circulation in the reaction zone is maintained so high, by increase in pressure of the electrolyte passing through the pores and increases in the pore sizes so that the chlorine gas contacts the zinc electrode.

The invention may be employed with other cell systems, such as zinc-caustic (zincate)-oxygen systems but the zinc-zinc chloride-chlorine systems appear to be significantly better. In addition, equivalent results are obtained when the holes in the electrode are 1/32 inch.

It can also be appreciated that the holes for venting of the gas may be present in the impervious electrode rather than the preferred porous electrode. The disadvantages in using holes in the impervious electrode is that electrolyte may then flow into another cell which may cause internal electrical shorting. By having the holes in the porous electrode individual cell characteristics can be maintained.

I claim:

1. An apparatus for use in an electric energy storage device comprising a first member having a front and a back side, a second member having a front and a back side, a plurality of passageways formed by the attachment of the back sides of the first and second members, said members having a relatively low pressure differential there across, a venting means for passing undissolved halogen gas from the passageways and further providing that the front side of the first member is a positive electrode in one cell and the front side of the second member is a negative electrode of a second cell, the first member being porous and adapted to pass the electrolyte from the passageways through it and the second member being gas and electrolyte impervious; whereby any possibility of of gas locking after the porous electrode is flooded is effectively prevented; the porous member having a pore size ranging from about 10 to about 100 microns and the venting means being holes communicating with the passageways and ranging in diameter from about 0.5 to about 3 millimeters.

2. The apparatus of claim 1 wherein the porous member is grooved so that upon attachment to the second member, the passageway for electrolyte flow is formed.

3. The apparatus of claim 1 wherein the first and second members are carbonaceous.

4. The apparatus of claim 1 wherein the first and second members are comprised of graphite.

5. An electric energy storage device comprising the electrode compartment means containing therein at least two of the apparatus of claim 1, wherein an oxidizable metal is on the front sides of the negative electrodes which metal will oxidize upon discharge, a source of halogen in a storage compartment means available for discharge, a conduit means for connecting the electrode compartment means and the storage compartment means, an aqueous metal halide electrolyte in communication with the positive and negative electrodes and a means for passing the halogen from the source in the storage compartment means through the conduit means to the electrolyte in the electrode compartment means.

6. The device of claim 5 wherein the porous member is grooved so that upon the attachment to the second member the passageway for flow of electrolyte is formed.

7. The device of claim 5 wherein the electrolyte is zinc chloride and the gas is chlorine.

8. A process for producing electrical energy in the device of claim 5 comprising the steps of:
 1. charging the device by:
   a. passing electricity through the aqueous metal halide solution, thereby generating halogen at the positive electrode and depositing the metal from the aqueous metal halide electrolyte on the front sides of the negative electrodes;
   b. storing the halogen in the storage compartment means so that it would be available during discharge;
 2. discharging the device by:
   a. passing the aqueous metal halide electrolyte containing dissolved halogen, which is from the source of halogen in the storage compartment means into the electrode compartment means;
   b. passing the electrolyte containing dissolved halogen through the porous positive electrode;
   c. completing the circuit between the positive and negative electrodes and allowing the electrochemical discharge reaction to occur;
   d. venting undissolved gas through holes communicating with the porous electrode whereby any possibility of gas locking after the porous electrode is flooded is prevented;
   e. passing the electrolyte out of the electrode compartment means;
   f. dissolving additional halogen into the electrolyte; and
   g. returning to Step 2-(a).

9. The process of claim 8 wherein the electrolyte is zinc chloride and the gas is chlorine.

10. The process of claim 8 wherein the electrolyte is passed into the passageways formed by the attachment of the back sides of the first and second members, said members being assembled in a vertical position, said members having a relatively low pressure differential there across, flowing the electrolyte up through the passageways and passing undissolved gas through the holes communicating with the porous member, the holes being located near the top of the vertical porous halogen electrode.

11. The process of claim 8 wherein the electrolyte is an aqueous zinc chloride electrolyte having a concentration ranging from about 10% to about 35% by weight and the halogen is stored as chlorine hydrate.

12. The process of claim 8 wherein the first and second members are carbonaceous.

13. The process of claim 8 wherein the first and second members are comprised of graphite.

* * * * *